(12) United States Patent
Black

(10) Patent No.: US 6,304,247 B1
(45) Date of Patent: Oct. 16, 2001

(54) PIEZOELECTRIC STICK POINTING DEVICE

(75) Inventor: Marc A. Black, South Bend, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/260,345

(22) Filed: Mar. 2, 1999

(51) Int. Cl.[7] .................................................. G09G 5/08
(52) U.S. Cl. .......................................... 345/161; 345/157
(58) Field of Search .................................. 345/157, 161, 345/156

(56) References Cited

U.S. PATENT DOCUMENTS

| | | |
|---|---|---|
| 5,748,180 | 5/1998 | Inukai . |
| 5,828,363 * | 10/1998 | Yaniger et al. ...................... 345/156 |
| 5,889,507 * | 3/1999 | Engle et al. .......................... 345/161 |
| 5,905,485 * | 5/1999 | Podoloff ............................... 345/161 |
| 5,966,117 * | 10/1999 | Seffernick et al. ................... 345/161 |
| 6,002,388 * | 12/1999 | Seffernick et al. ................... 345/161 |
| 6,115,030 * | 9/2000 | Berstis et al. ........................ 345/161 |
| 6,121,954 * | 9/2000 | Seffernick ............................ 345/161 |

* cited by examiner

*Primary Examiner*—Kent Chang
(74) *Attorney, Agent, or Firm*—Mark P. Bourgeois; Mark W. Borgman

(57) ABSTRACT

A pointing and signaling device for controlling the positioning, movement and operation of a cursor on a display screen that has a single piezoelectric element to indicate movement in three axes. The device generates electrical signals in response to a users force or actuation. The device has an actuator attached to a base. A piezoelectric element is mounted between the actuator and the base for generating electrical signals representative of a magnitude and direction of force applied to the actuator. The piezoelectric element is a shaped as a hollow cylinder. The piezoelectric element includes several conductive traces located on an outer surface of the element and a ground plate located on the inner surface of the element. The conductive plates and the ground plate are connected to a flexible cable by solder.

8 Claims, 3 Drawing Sheets

PIEZOELECTRIC STICK POINTING DEVICE

BACKGROUND OF THE PREFERRED EMBODIMENT(S)

1. Field of the Preferred Embodiment(s)

This invention generally relates to a pointing device for controlling the positioning, movement and operation of a cursor on a display screen. Specifically, there is a pointing device that uses a single piezoelectric element to indicate movement in three axes.

2. Background of the Invention

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. That manufacturer may also provide two upwardly extending "mouse" or "click" buttons immediately below the space bar.

These pointing sticks utilize resistors or strain gauge resistors to sense changes in movement of the stick. The resistors suffer from several problems. First, they are sensitive to changes in temperature. Second, the resistance change as they are moved is very small which causes difficulty in sensing the amount of position change and which requires amplification circuitry to be placed close to the pointing stick.

Further, despite the advantages of prior art cursor controls, they have been difficult to economically manufacture. In particular, providing the electrical connections between the resistors and the flexible cable which connects to a computer mother board has been complicated and expensive. Therefore, there is a current unmet and heretofore long felt need for a pointing stick, that has a large output signal and is easily manufactured.

3. Description of Related Art

Examples of patents related to the present invention are as follows, and each patent is herein incorporated by reference for the supporting teachings:

U.S. Pat. No. 5,748,180, is a pointing device for controlling cursor movement on display.

The foregoing patents reflect the state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

SUMMARY OF THE PREFERRED EMBODIMENT(S)

It is a feature of the invention to provide a pointing and signaling device for controlling the positioning, movement and operation of a cursor on the display screen that has a single piezoelectric element to indicate movement in three axes.

A further feature of the invention is to provide a device which generates electrical signal in response to a users force or actuation. An actuator is attached to a base. A piezoelectric element is mounted between the actuator and the base for generating electrical signals representative of a magnitude and direction of force applied to the actuator. The piezoelectric element includes several conductive traces located on a first surface of the element and a ground plate located on a second surface of the element. The piezoelectric element is cylindrical shaped and has a bore passing therethrough. The first surface is located on the outside of the element and the second surface is located inside the bore. The traces are each electrically connected to a flexible cable by a solder joint.

Another feature of the invention is to provide a device for generating electrical signals in response to forces applied thereon. The device is connected to a flexible cable. An actuator is connected to a base. A piezoelectric mechanism or means is mounted between the actuator and the base for generating electrical signals representative of a magnitude and direction of force applied to the actuator. An electrical connection mechanism or means is connected to the piezoelectric mechanism and to the flexible cable for routing the electrical signals from the piezoelectric mechanism to the flexible cable.

The invention resides not in any one of these features per se, but rather in the particular combination of all of them herein disclosed and claimed and it is distinguished from the prior art in this combination of all of its structures for the functions specified.

There has been thus been outlined, rather broadly, the more important features of the invention so that the detailed description thereof that follows may be better understood, and so that the present contribution to the art may be better appreciated. There are, of course, additional features of the invention that will be described hereinafter and which will form the subject matter of the appended claims. Those skilled in the art will appreciate that the preferred embodiment may readily be used as a basis for the designing of other structures, methods and systems for carrying out the several purposes of the present invention. It is important, therefore, that the claims are regarded as including such equivalent constructions since they do not depart from the spirit and scope of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
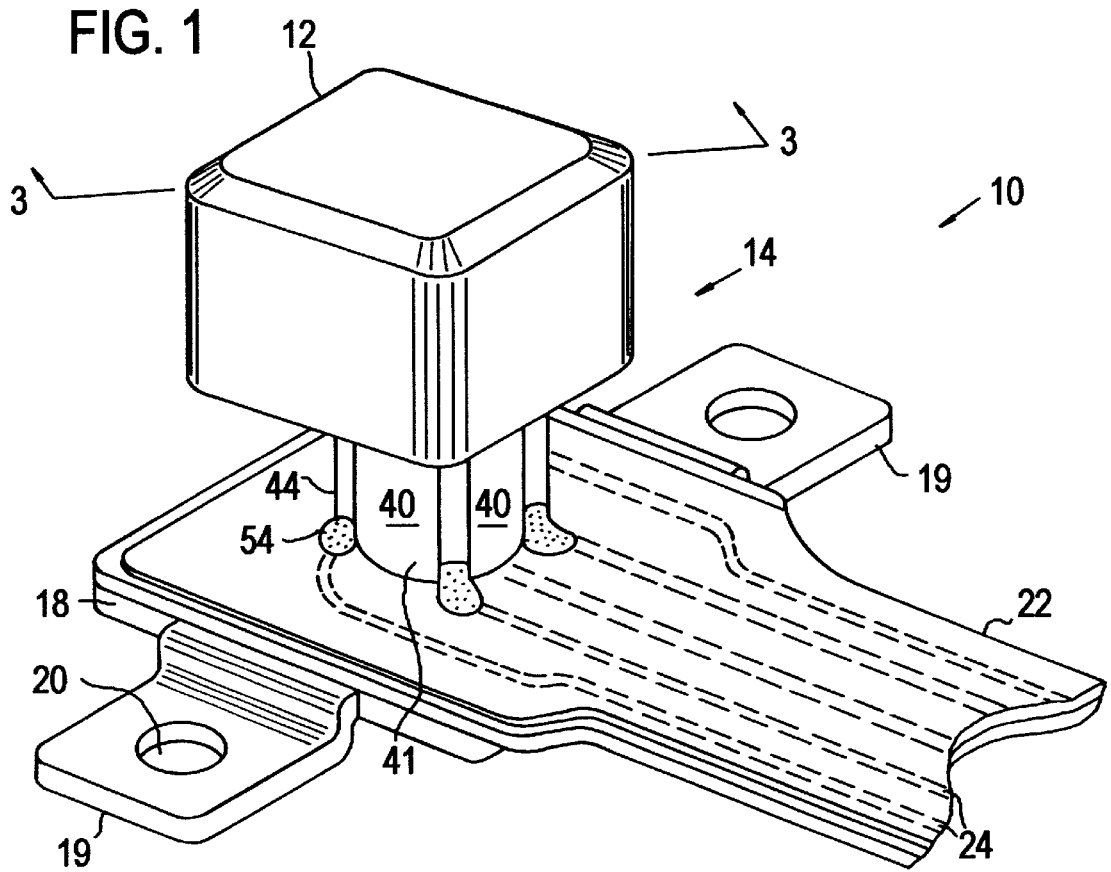
FIG. 1 is an isometric view of the preferred embodiment of the piezoelectric pointing device.
Figure 2:
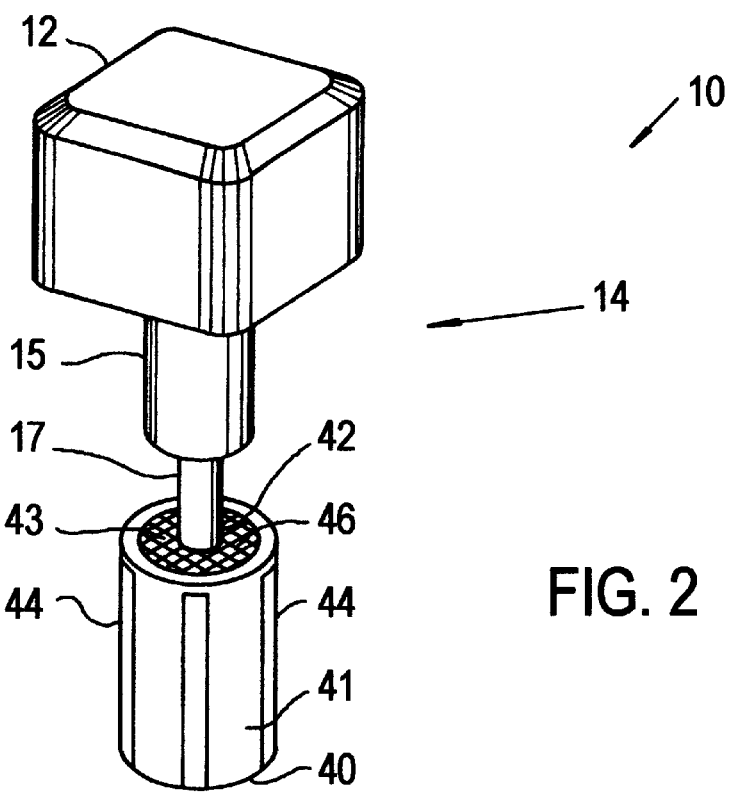
FIG. 2 is an isometric exploded view of FIG. 1.
Figure 2:
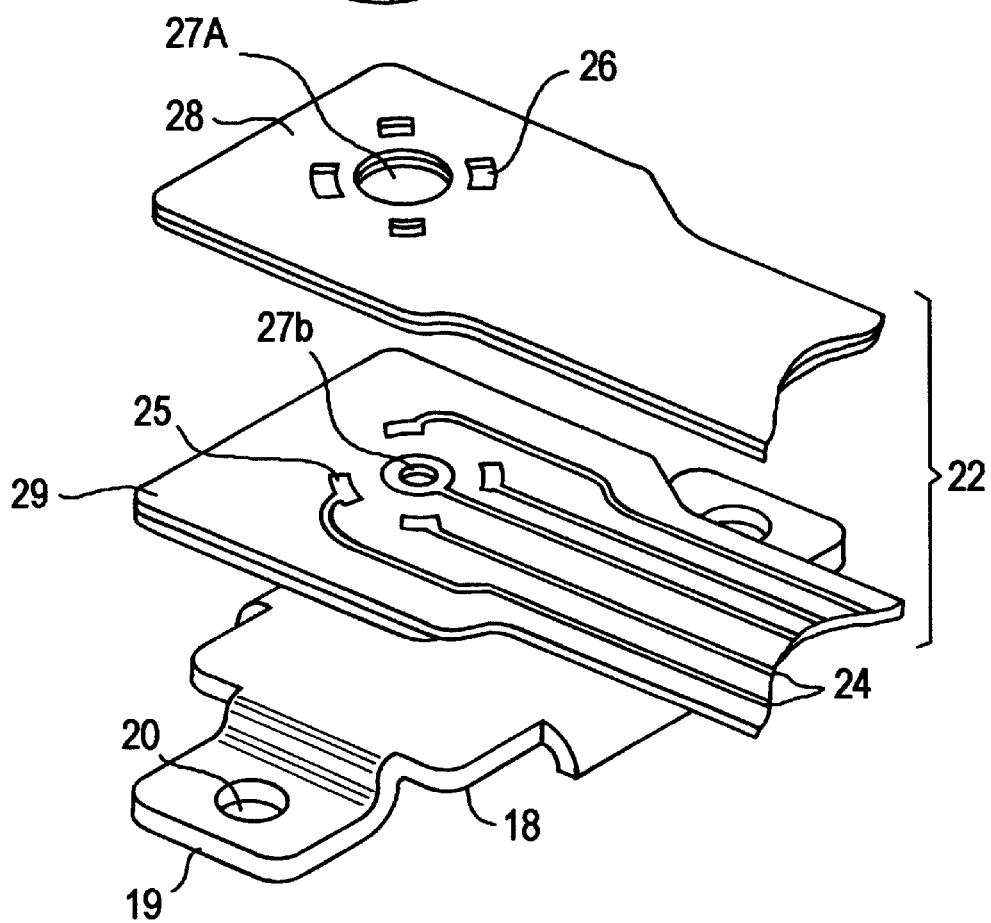
Figure 3:
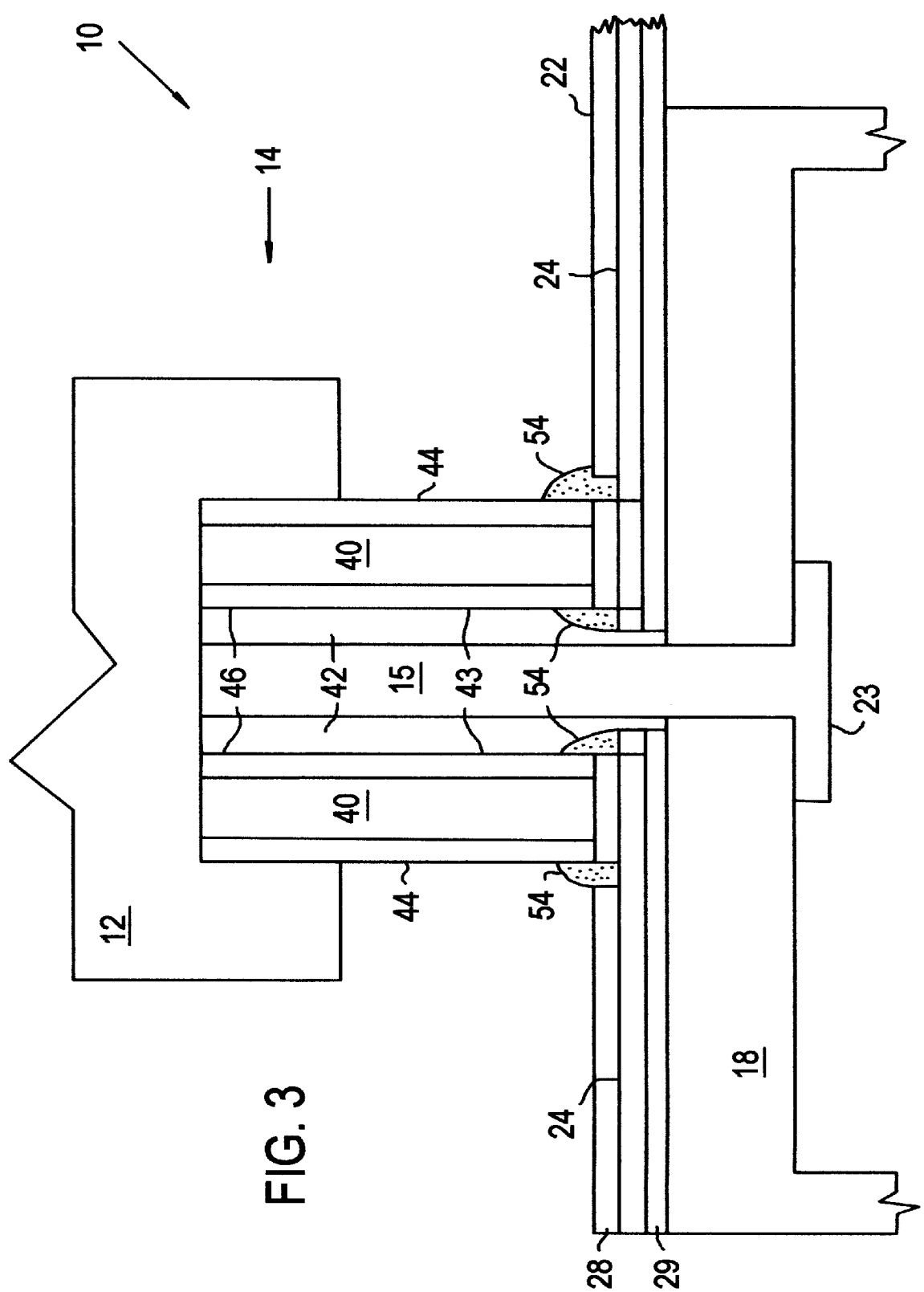
FIG. 3 is a side cross-sectional view of FIG. 1 along section line 3—3.

Referring to FIGS. 1, 2 and 3 there is a piezoelectric pointing device or assembly 10 that can be used to control the movement of a cursor on a computer screen in response to applied forces. In particular, assembly 10 has an actuator 14 that has a cap 12, an elongated stick or shaft 15 and a shaft end 17. Shaft 15 would typically be formed from molded plastic. A base 18 has feet 19, mounting apertures 20 and a shaft aperture (not shown). Feet 19 would be placed on a keyboard (not shown) and affixed there with fasteners (not shown) passing through apertures 20. Shaft 17 extends through apertures 27A, 27B and the base shaft aperture and would be crimped or heat staked to form a crimp 23 that holds actuator 14 to base 18. If desired signal processing circuitry (not shown) could be mounted along cable 22 to amplify or modify electrical signals generated by the piezoelectric pointing device.

A flexible cable 22 extends over base 18 and has several conductive circuit lines 24 disposed thereon or therein. Cable 22 is a conventional flexible circuit cable with copper circuit lines 24 extending along the length of the cable. Cable 22 would connect with other electrical circuitry (not shown) for processing of electrical signals generated by the piezoelectric pointing device 10. Cable 22 can be a single layer or can be multilayered. Cable 22 also has conductive pads 25 that are used to form an electrical connection. Cable 22 has a cable apertures 27A and 27B through which shaft end 17 passes. Piezoelectric element 40 is located between actuator 14 and cable 22.

Piezoelectric element 40 has an aperture 42 through which shaft end 17 passes. Piezoelectric element 40 is formed from conventional piezoelectric materials such as lead zirconium titanate. Piezoelectric element 40 has an elongated cylindrical shape and is hollow. Element 40 has four conductive traces 44 on an outer surface 41. A ground plate 46 is located on inner surface 43 covering most of surface 43. Traces 44 and ground plate 46 are formed from conventional thick film materials.

Cable 22 has a top insulator 28 and a bottom insulator 29 covering circuit lines 24. Holes 26 are etched in top insulator 28 to define bond pads 25. Solder 54 is used to electrically and mechanically connect traces 44 and ground plate 46 to circuit lines 24. Solder 54 would typically be applied as a paste or a preform and then reflowed. It is noted that solder 54 bonds to the inside surface 43 of the cylinder where ground plate 46 is located.

During operation, a user manually moving actuator 14 in a direction causes compression of element 40 between actuator 14 and cable 22. The compression of piezoelectric element 40 causes a charged area to be formed within element 40. These charges are collected by the nearest conductive trace 44 forming a charged capacitor between trace 44 and ground plate 46. The magnitude of voltage on the pairs of traces 44 and plate 46 is indicative of the direction and force applied to actuator 14. The voltage on traces 44 and plate 46 is outputted as four electrical signals on circuit lines 24. The electrical signals are amplified and processed by additional electronic circuitry (not shown) which would be connected to circuit lines 24. The processed electrical signals can be used with a computer display to control the location and movement of a cursor on display screen. The amount and direction of force applied to actuator 14 is sensed to cause movement of the cursor. The speed and direction of cursor movement corresponds to the amount and direction of pressure on actuator 14.

The piezoelectric pointing device 10 is assembled as follows: First, the piezoelectric element 40 is formed by molding a powder of lead zirconium titanate into a hollow cylinder. Next, element 40 is fired in an oven, causing sintering and solidification. The traces 44 and ground plate 46 are screen printed with a thick film conductor material and fired in an oven. Next, solder paste 54 is screen printed onto pads 25 of cable 22. Piezoelectric element 40 has traces 46 aligned with pads 25 and placed on cable 22. Element 40 and cable 22 are run through a reflow furnace reflowing solder 54. Base 18 is placed below cable 22 and end 17 is inserted through apertures 42, 27A, 27B and the base aperture (not shown). End 17 is then crimped or heat staked to form crimp 23. A cap 12 is placed over shaft 15 completing assembly 10.

VARIATIONS OF THE PREFERRED EMBODIMENT(S)

One of ordinary skill in the art of making pointing sticks will realize that there are many different ways of accomplishing the preferred embodiment. For example, although it is contemplated to make actuator 14 and base 18 out of molded plastic material, any suitable material would work, like ceramics or metals. Additionally, although a flexible cable 22 is illustrated, other types of cables such as insulation displacement cables or ribbon cables may be used.

It is further possible to have the piezoelectric element 40 interface with something other than a flex cable, for example it could interface with a connector, a terminal pin, a leadframe or a printed circuit board or a silicon integrated circuit.

Even though the specification has shown the use of one piezoelectric element, it is possible to use more than one element to get a larger output signal.

The invention showed the use of lead zirconium titanate as the piezoelectric element. Other materials may be used such as quartz crystals, or any polarizable crystal structure.

It is possible to use more than four conductive traces 44 or fewer than four conductive traces 44.

Even though the specification has shown the use of solder to connect between the piezoelectric element and the flexible cable, it is possible to use other materials such as conductive epoxy.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A device for generating electrical signals responsive to a users actuation thereof, comprising:
   a) an actuator;
   b) a base having the actuator mounted thereto;
   c) a piezoelectric element, mounted between the actuator and the base, for generating electrical signals representative of a magnitude and direction of force applied to the actuator; and
   d) a plurality of conductive traces disposed on a first surface of the element; and
   e) a around plate disposed on a second surface of the element.

2. The device according to claim 1, wherein the piezoelectric element is cylindrical shaped and has a bore passing therethrough, the first surface located on the outside of the element and the second surface located inside the bore.

3. The device according to claim 1, wherein the traces are each electrically connected to a flexible cable by a solder joint.

4. The device according to claim 1, wherein the ground plate is electrically connected to a flexible cable by a solder joint.

5. The device according to claim 1, wherein the actuator extends through the bore.

6. A device for generating electrical signals indicative of forces applied to the device by a user, comprising:
- a) an actuator;
- b) a base having the actuator mounted thereto; and
- c) a piezoelectric element, mounted between the actuator and the base, for generating electrical signals representative of a magnitude and direction of force applied to the actuator including:
  - a) a plurality of conductive traces disposed on a first surface of the piezoelectric element; and
  - b) a ground plate disposed on a second surface of the piezoelectric element; and
- d) a flexible cable having circuit lines thereon, the conductive traces and the ground plate electrically connected to the circuit lines.

7. A device for generating electrical signals in response to forces applied thereon, the device connected to a flexible cable comprising:
- a) an actuator;
- b) a base having the actuator mounted thereto;
- c) piezoelectric means, mounted between the actuator and the base, for generating electrical signals representative of a magnitude and direction of force applied to the actuator, the piezoelectric means includes a piezoelectric element having a plurality of conductive traces disposed on a first surface of the element and a ground plate disposed on a second surface of the element; and
- d) electrical connection means, connected to the piezoelectric means and to the flexible cable for routing the electrical signals from the piezoelectric means to the flexible cable.

8. The device according to claim 1, wherein the electrical connection means is solder connected between the traces, the ground plate and a plurality of circuit lines on the flexible cable.

* * * * *